(12) United States Patent
Hung et al.

(10) Patent No.: US 10,560,400 B2
(45) Date of Patent: Feb. 11, 2020

(54) METHOD FOR MANAGING TRAFFIC ITEM IN SOFTWARE-DEFINED NETWORKING

(71) Applicants: Inventec (Pudong) Technology Corp., Shanghai (CN); Inventec Corporation, Taipei (TW)

(72) Inventors: Chi-Hsiang Hung, Taipei (TW); Chao-Wei Huang, Taibei (TW); Li-Chun Wang, Taibei (TW); Te-Yen Liu, Taibei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 155 days.

(21) Appl. No.: 15/743,669

(22) PCT Filed: Mar. 25, 2016

(86) PCT No.: PCT/CN2016/077343
§ 371 (c)(1),
(2) Date: Jan. 11, 2018

(87) PCT Pub. No.: WO2017/084228
PCT Pub. Date: May 26, 2017

(65) Prior Publication Data
US 2018/0205671 A1    Jul. 19, 2018

(30) Foreign Application Priority Data

Nov. 20, 2015  (CN) .......................... 2015 1 0812796

(51) Int. Cl.
*H04L 12/935* (2013.01)
*H04L 12/44* (2006.01)
*H04L 12/707* (2013.01)
*H04L 12/715* (2013.01)

(52) U.S. Cl.
CPC .......... *H04L 49/3009* (2013.01); *H04L 12/44* (2013.01); *H04L 45/24* (2013.01); *H04L 45/64* (2013.01)

(58) Field of Classification Search
USPC .......................................... 709/244, 243, 238
See application file for complete search history.

(56) References Cited

U.S. PATENT DOCUMENTS

| | | | |
|---|---|---|---|
| 9,853,898 B1* | 12/2017 | Subramanian | ........ H04L 45/745 |
| 2013/0170354 A1* | 7/2013 | Takashima | .............. H04L 47/12 |
| | | | 370/235 |
| 2013/0311647 A1* | 11/2013 | Inoue | .................... H04L 49/254 |
| | | | 709/224 |

OTHER PUBLICATIONS

Open Flow Switch Specification, by Open Network Foundation, Ver. 1.3.1, dated Sep. 6, 2012 (Year: 2012).*

* cited by examiner

*Primary Examiner* — Jamaal Henson
(74) *Attorney, Agent, or Firm* — Winston Hsu

(57) ABSTRACT

A method for managing traffic item in software defined networking includes establishing a downlink flow table of a switch according to the flow entries, establishing an uplink flow table of the switch according to the flow entries, acquiring a data packet by the switch, and generating a transmission path to allocate the data packet according to the data packet, the downlink flow table, and the uplink flow table. The downlink flow table includes a correlation between first transmission ports of the switch and down link switches. The uplink flow table includes a correlation between the first transmission ports and a transmission port group of uplink switches.

12 Claims, 7 Drawing Sheets

METHOD FOR MANAGING TRAFFIC ITEM IN SOFTWARE-DEFINED NETWORKING

BACKGROUND OF THE INVENTION

1. Field of the Invention

The present invention illustrates a method for managing traffic item under a software defined networking, and more particularly, a method for managing traffic item by using several flow tables.

2. Description of the Prior Art

With advancements of cloud computing system, virtualization technique becomes an important issue in our daily life. The idea of virtualization technique is to use several virtual machines instead of a physical host server. These virtual machines are operated in parallel and can provide reliable service quality. However, when the virtualization technique is applied to the cloud computing system, the data center network requires massive computational complexity, computational capability, and data storage capacity. Thus, a soft defined network (SDN) system in conjunction with OpenFlow protocol is developed by Stanford University. The original propose is to extend the programmable capability for the campus network and provide the corresponding virtualization client interface. Generally, the SDN includes a centralized controller and thousands of switches. These switches are interconnected and coupled to all physical host servers through complex transmission paths. Specifically, these interconnected switches are assigned according to a topology structure. In other words, the data center network under the SDN is established according to the topology structure.

The OpenFlow protocol is designed for achieving network simplification and managing network traffic by controlling a flow-level of the network. In this protocol, a controller can perform an optimal traffic allocation. Specifically, the controller can acquire and manage each network device and its layout status within a predetermined coverage. The controller can perform a customized management process under the soft defined network by using configurations of flow entries through an application program. Currently, two management modes of the OpenFlow protocol are provided, called as a reactive mode and a proactive mode. In the reactive mode, when a transmission path of a data packet of the switch cannot be determined, the data packet has to be transmitted to the controller for performing a query process. Then, the controller can determine some satisfactory transmission paths according to the data packet to all switches located on the transmission paths. Thus, in the reactive mode, a memory capacity requirement for saving additional (or say, non-essential) flow tables of the switch (located on the transmission path) can be reduced. However, an operational load of the switch may be increased because of performing the query process frequently, thereby leading to decrease traffic performance of the switch and the controller. In the proactive mode, all transmission paths are preconfigured with respect to various data packets by the controller. Thus, the data packet of the switch can be directly assigned to a corresponding transmission path by matching the data packet with at least one entry in the flow table. Thus, in the proactive mode, the traffic performance of the switch and the controller can be improved. However, the memory capacity requirement for saving additional (or say, non-essential) flow tables may be increased. Since the memory capacity requirement cannot be reduced in the proactive mode, scalability of the data center is limited.

For a conventional switch, a ternary content addressable memory (TCAM) is used for saving the flow tables. However, comparing the TCAM with a static random access memory (SRAM), the power consumption of the TCAM is higher than the SRAM. Further, the TCAM requires high cost for manufacturing, especially in high memory capacity requirement. Thus, when the dimension of the topology structure of the data center is increased, the memory capacity requirement for saving the flow tables of the conventional switch may be exponentially increased. Thus, the TCAM may be disabled or interrupted when an out of memory (OOM) state occurs. Also, the operational load of the controller may be increased since a large amount of data may be transmitted between the controller and the switches.

Thus, to develop a flow entries management with high efficiency and low memory capacity requirement under the soft defined network is an important issue.

SUMMARY OF THE INVENTION

To overcome drawbacks of previously mentioned prior art, the present invention aims at providing a method for managing traffic item in software defined networking in order to solve several issues of the prior art.

This is achieved by providing a method for managing traffic item in software defined networking. The method comprises establishing a downlink flow table of a switch according to the flow entries, establishing an uplink flow table of the switch according to the flow entries, acquiring a data packet by the switch, and generating a transmission path for allocating the data packet according to the data packet, the downlink flow table, and the uplink flow table. The downlink flow table comprises a correlation of a plurality of first transmission ports of the switch and at least one downlink switch. The uplink flow table comprises a correlation of the plurality of first transmission ports of the switch and a transmission port group of at least one uplink switch.

In another embodiment of the present invention, a software defined networking system is disclosed. The software defined networking system comprises a plurality of aggregate level switches, a plurality of core level switches, a plurality of edge level switches, and a controller. Each aggregate level switch comprises a downlink flow table and an uplink flow table. The plurality of core level switches are linked to the plurality of aggregate level switches. The plurality of edge level switches are linked to the aggregate level switches. The controller is linked to the plurality of core level switches, the plurality of aggregate level switches, and the plurality of edge level switches. After a data packet is acquired by an aggregate level switch, the controller generates a transmission path for allocating the data packet according to the data packet, the downlink flow table, and the uplink flow table. The downlink flow table comprises a correlation of a plurality of first transmission ports of the aggregate level switch and at least one edge level switch corresponding to the aggregate level switch. The uplink flow table comprises a correlation of the plurality of first transmission ports of the aggregate level switch and a transmission port group of at least one core level switch corresponding to the aggregate level switch.

To sum up, the present invention illustrates a method for managing traffic item of a data center under a software defined networking. The method uses a downlink flow table, an uplink flow table, and an uplink group table of a switch without any information loss instead of using a conventional complex flow table listed all possible flow entries for greedy search. Further, the number of average flow entries of the switch is slightly increased when the dimension of the data center is increased. The number of total flow entries of the data center is fixed when the network traffic of the data center is increased. Thus, the data center of the present invention can provide a method for managing traffic item with low complexity in conjunction with low memory capacity requirement.

These and other objectives of the present invention will no doubt become obvious to those of ordinary skill in the art after reading the following detailed description of the preferred embodiment that is illustrated in the various figures and drawings.

DETAILED DESCRIPTION

The following description of embodiments of the present invention through specific concrete examples, one skilled in the art can easily understand advantages and efficacy of the present invention. The present invention can also be implemented through another application or various specific embodiments. The details of this specification may be based on different perspectives and applications without departing from the idea of the present invention under various modifications or changes. It should be noted that, in case of no conflict, the embodiments and the examples of embodiment may be combined with each other feature.

It should be noted that the following examples illustrated as schematic form can provide to illustrate the basic idea of the invention. The drawings shown the components of the present invention are related to the number of components. However, the shapes and sizes of the components may be modified in actual implementation, while the component layout patterns may be more complex.

Figure 1:
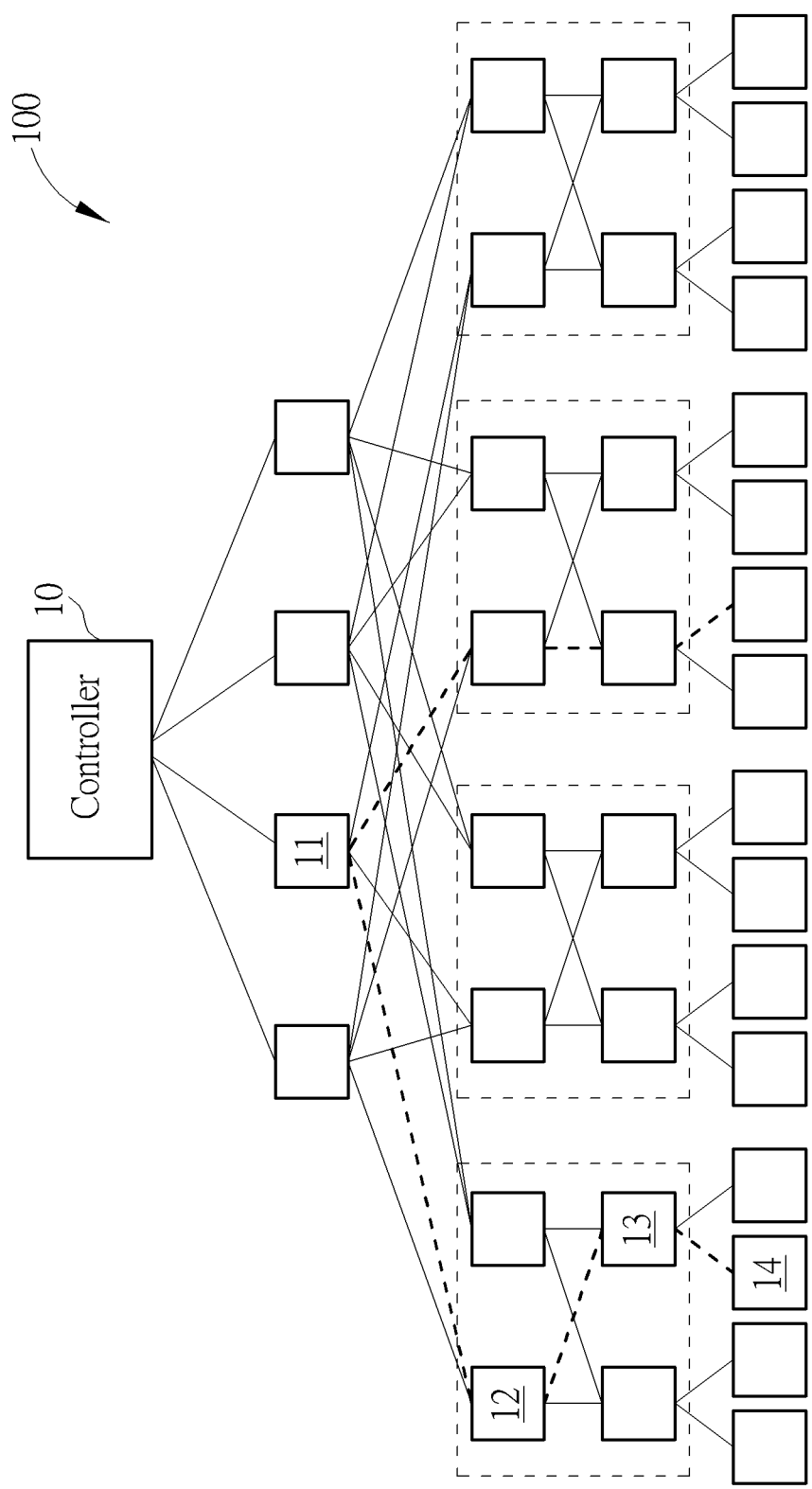
FIG. 1 is a topology structure of a data center under a soft defined network according to an embodiment of the present invention.

FIG. 1 is a topology structure of a data center 100 under a soft defined network according to an embodiment of the present invention. In FIG. 1, the data center 100 (or generally say, the soft defined network system) includes a plurality of aggregate level switches 12, a plurality of core level switches 11, and a plurality of edge level switches 13, a controller 10, and a plurality of hosts 14. In the embodiment, a topology structure of the data center 100 is a Fat-Tree topology structure. However, the topology structure of the data center 100 is not limited to use the Fat-Tree topology structure. In the data center 100, the plurality of core level switches 11 are allocated on an upper level of the data center 100. The plurality of aggregate level switches 12 are allocated on an intermediate level of the data center 100. The plurality of edge level switches 13 are allocated on a lower level of the data center 100. Each core level switch 11 is linked to at least one corresponding aggregate level switch 12. Each aggregate level switch 12 is linked to at least one corresponding edge level switch 13. Each edge level switch 13 is linked to at least one corresponding host 14. The controller 10 is linked to the plurality of core level switches 11, the plurality of aggregate level switches 12, and the plurality of edge level switches 13. Instead of using a distributed control structure, the data center 100 can be applied under the soft defined network by using a centralized control structure. In the soft defined network, the controller 10 can deal with all control operations of control panels on the switches. In other words, the controller 10 is capable of performing global observation of the network. The controller 10 can acquire all states of the switches within a network domain (spanning tree) of the data center 100. Thus, a user can easily manage the data center 100 under the soft defined network by using an application program with respect to the controller 10 and flow entries. Particularly, the switches of the data center 100 can perform a data forwarding function. For example, in FIG. 1, a dotted line path is denoted as a data transmission path between two hosts 14. In the data center 100, the controller 10 can generate an appropriate data transmission path for transmitting a data packet between two hosts 14 with different positions through several switches. In the embodiment, the software defined networking can use a protocol of OpenFlow. Under the protocol of OpenFlow, a ternary content addressable memory (TCAM) can be introduced to the switch for saving several flow tables. Here, the data center 100 can use a proactive mode defined by the protocol of OpenFlow. In the proactive mode, when the data packet is received by the switch, header information of the data packet is compared with entries of the flow tables. Then, the appropriate transmission path can be generated for transmitting the data packet. In the embodiment, a "flow" is defined as information including an optimal application data transmission path, contents of the data packet, statistics of the data packet, and configurations of the data packet. In the data center 100, traffic performance of the controller 10 and traffic performance of switches (i.e., such as the core level switches 11, the aggregate level switches 12, and the edge level switches 13) can be improved by using the flow tables under the proactive mode. Further, required capacity of the TCAM can be reduced. In the following, a process for establishing a plurality of flow tables is illustrated.

Figure 2A:
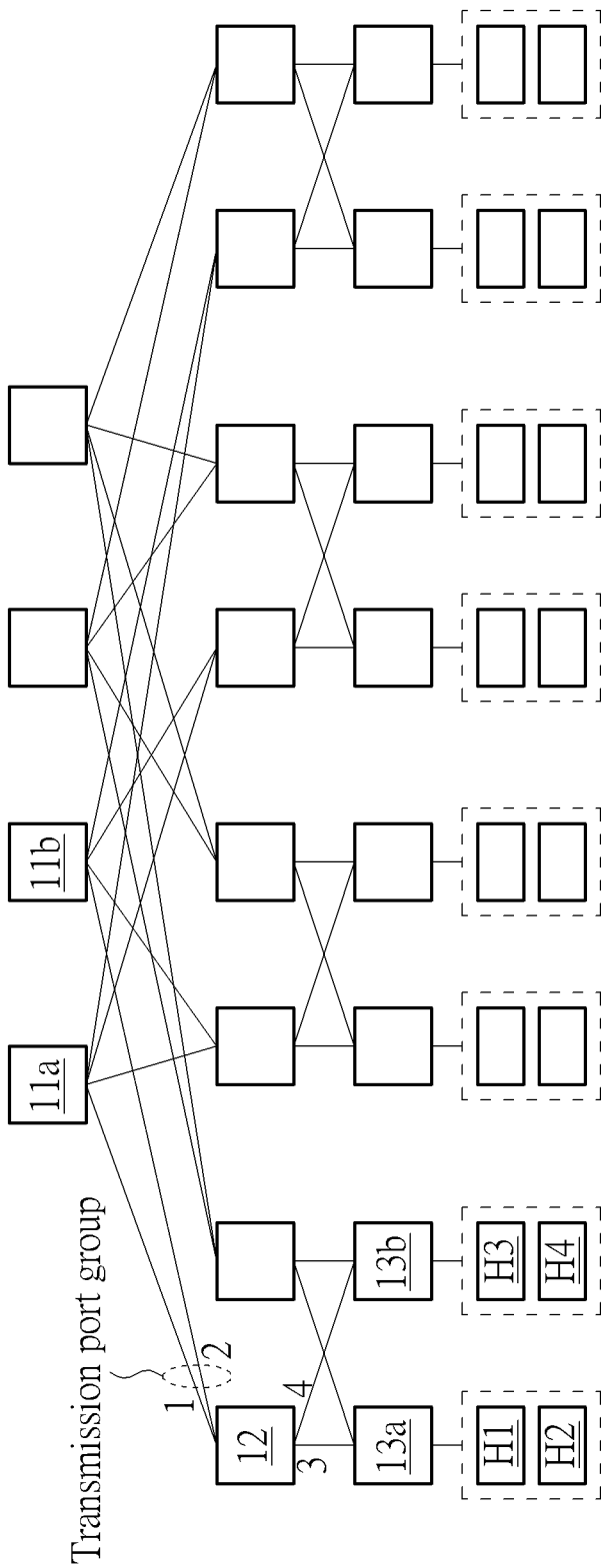
FIG. 2A is a link structure of transmission ports of aggregate level switches, other switches, and hosts of the data center under the soft defined network in FIG. 1.
Figure 2B:
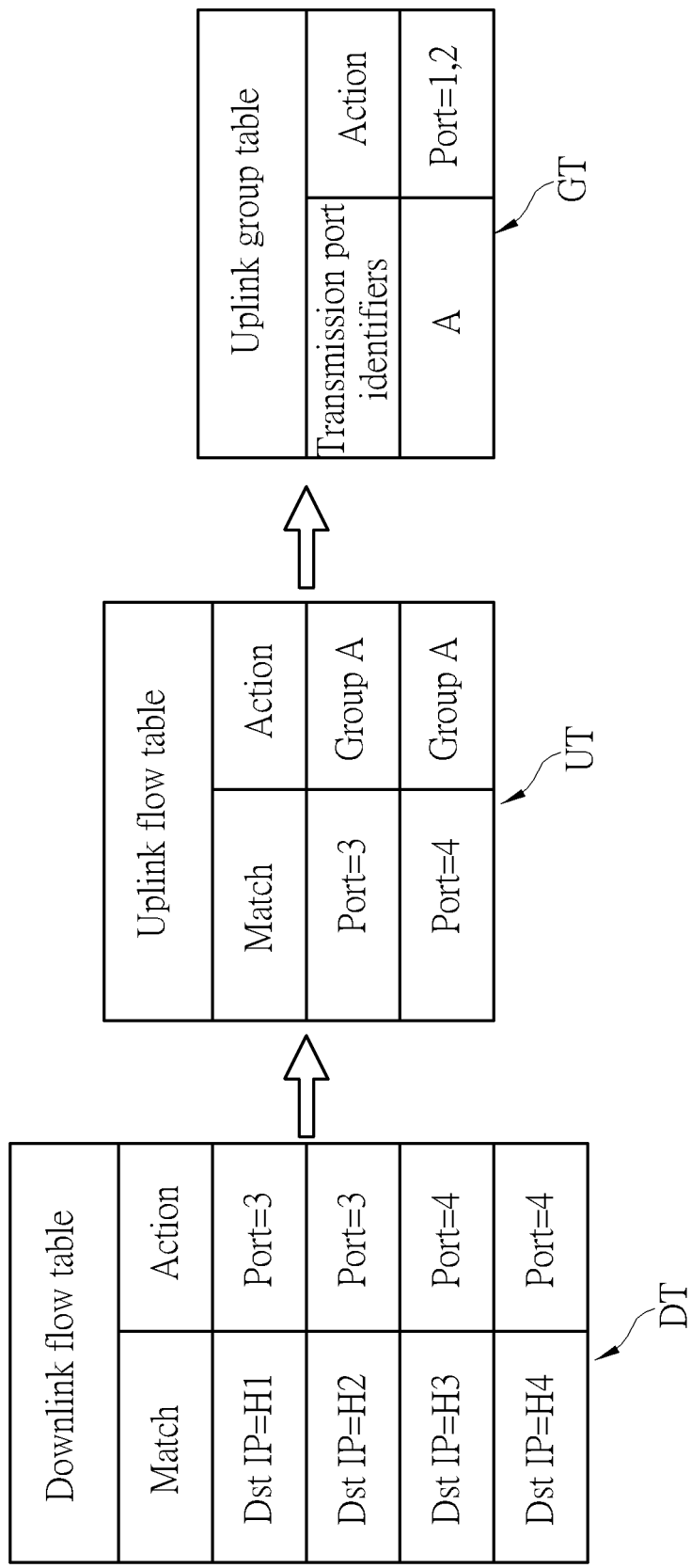
FIG. 2B is an illustration of a method for establishing a plurality of flow tables by a switch in FIG. 2A.

FIG. 2A is a link structure of transmission ports of aggregate level switches 12, other switches, and hosts of the data center 100. FIG. 2B is an illustration of a method for establishing a plurality of flow tables by a switch 12 in FIG. 2A. Please refer to FIG. 2A and FIG. 2B. In FIG. 2A, the switch 12 includes a transmission port 1, a transmission port 2, a transmission port 3, and a transmission port 4. The transmission port 1 is linked to an uplink switch 11a corresponding to the switch 12. The transmission port 2 is linked to an uplink switch 11b corresponding to the switch 12. As previously mentioned, the uplink switch 11a and the uplink switch 11b belong to two core level switches. The transmission port 3 is linked to a downlink switch 13a corresponding to the switch 12. The transmission port 4 is linked to a downlink switch 13b corresponding to the switch 12. As previously mentioned, the downlink switch 13a and the downlink switch 13b belong to two edge level switches.

Further, the downlink switch 13a is linked to a host H1 and a host H2. The downlink switch 13b is linked to a host H3 and a host H4. The switch 12 can introduce a plurality of flow tables with different "transmission types" instead of conventional flow tables, as shown in FIG. 2B. In FIG. 2B, the switch 12 can generate a downlink flow table DT, an uplink flow table UT, and an uplink group table GT. In the embodiment, the downlink flow table DT includes a correlation of a plurality of first transmission ports (i.e., the transmission port 3 and the transmission port 4) of the switch 12 and downlink switches 13a and 13b. For example, the transmission port 3 of the switch 12 is linked to the downlink switch 13a. The transmission port 4 of the switch 12 is linked to the downlink switch 13b. Since the downlink switch 13a is linked to the host H1 and the host H2 and the downlink switch 13b is linked to the host H3 and the host H4, four possible transmission paths can be introduced to the switch 12. The first transmission path is defined as a path from the transmission port 3 (source node) to the host H1 (destination node). The second transmission path is defined as a path from the transmission port 3 (source node) to the host H2 (destination node). The third transmission path is defined as a path from the transmission port 4 (source node) to the host H3 (destination node). The fourth transmission path is defined as a path from the transmission port 4 (source node) to the host H4 (destination node). Thus, in the downlink flow table DT, a match operation and an action operation can be introduced. All possible downlink transmission paths of the switch 12 can be saved to the downlink flow table DT. In FIG. 2B, the downlink flow table DT includes an action operation for matching the transmission port 3 (Port=3) to the host H1 (Dst IP=H1), an action operation for matching the transmission port 3 (Port=3) to the host H2 (Dst IP=H2), an action operation for matching the transmission port 4 (Port=4) to the host H3 (Dst IP=H3), and an action operation for matching the transmission port 4 (Port=4) to the host H4 (Dst IP=H4). Further, the uplink flow table UT includes a correlation of the plurality of first transmission ports (i.e., the transmission port 3 and the transmission port 4) of the switch 12 and a transmission port group of the uplink switches 11a and 11b. For example, when the switch 12 received uplink data from the transmission port 3, the uplink data can be transmitted to the uplink switch 11a or the uplink switch 11b. Here, a transmission port group A is defined as a set of the second transmission ports (i.e., the transmission port 1 and the transmission port 2) for performing uplink data transmission from the switch 12 to the uplink switch 11a or 11b. In other words, when the uplink data is received by the switch 12 from the transmission port 3 or the transmission port 4, two possible transmission paths can be introduced to the switch 12 for uplink data transmission. The first transmission path is defined as a path from the transmission port 3 (source node) to the uplink switch 11a or 11b (destination node) through the transmission port group A. The second transmission path is defined as a path from the transmission port 4 (source node) to the uplink switch 11a or 11b (destination node) through the transmission port group A. Thus, in the uplink flow table UT, a match operation and an action operation can be introduced. In FIG. 2B, the uplink flow table UT includes an action operation for matching the transmission port 3 (Port=3) to the transmission port group A, and an action for matching the transmission port 4 (Port=4) to the transmission port group A. Further, in the uplink group table GT, all transmission port identifiers of the transmission port group A is listed. For example, in the uplink group table GT, an identification code of the transmission port group A is denoted as "A". All transmission port identifiers of the transmission port group A can be listed as "Port=1, 2". However, any reasonable modification of the downlink table DT, the uplink table UT, the uplink group table GT should fall into the scope of the present invention. For example, the uplink group table GT can be integrated into the uplink table UT. However, the uplink group table GT can also be saved to an individual memory segment. In the following, a method for managing traffic item of the switch 12 is described.

Figure 3:
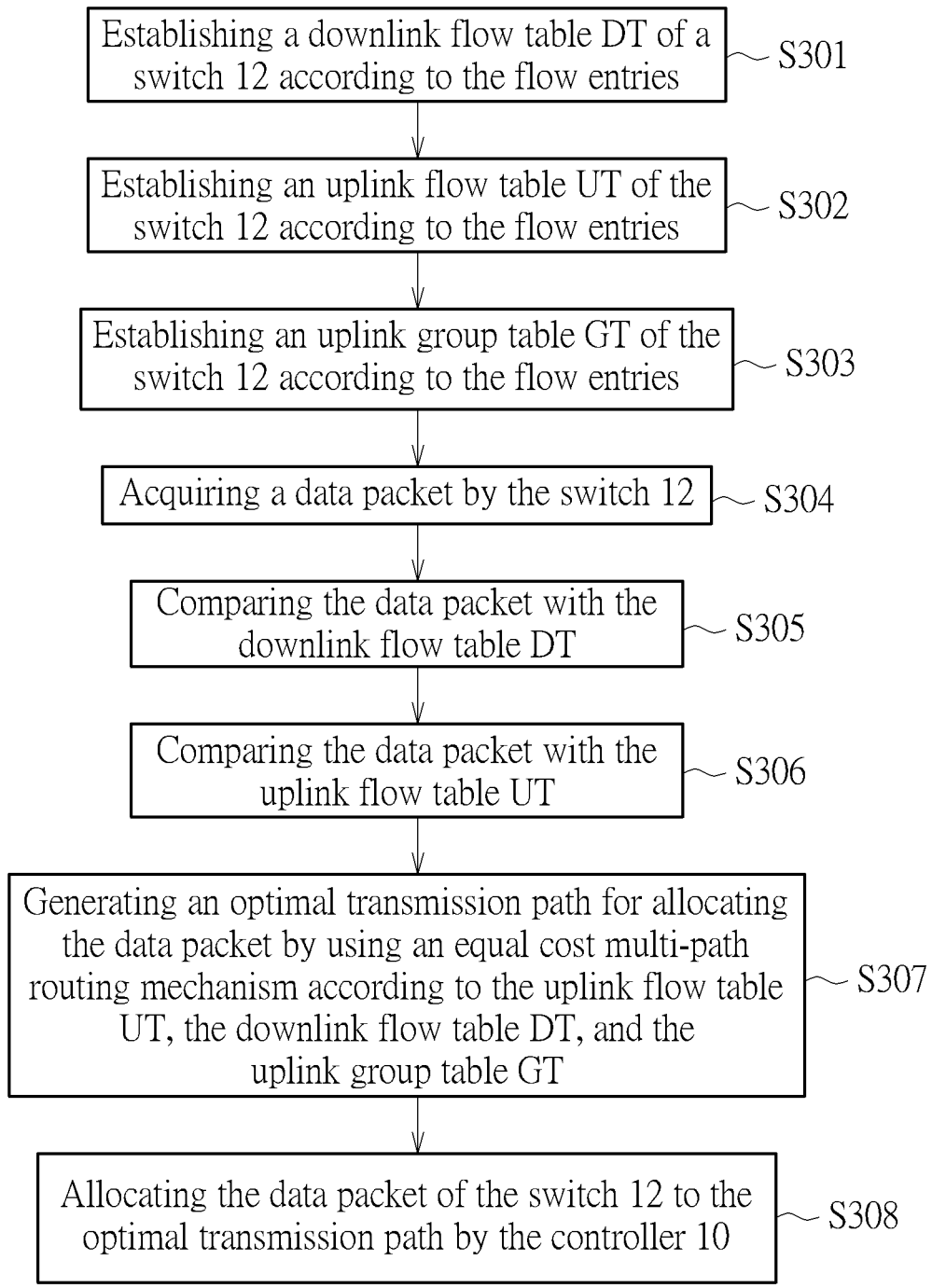
FIG. 3 is a flow chart of a method of flow entries management under the software defined networking.

FIG. 3 is a flow chart of a method of flow entries management of the switch 12 under the software defined networking. The method of flow entries management includes step S301 to step S308. However, any reasonable modification of step S301 to step S308 falls into the scope of the present invention. The method of flow entries management can be illustrated below.

step S301: establishing a downlink flow table DT of a switch 12 according to the flow entries;
step S302: establishing an uplink flow table UT of the switch 12 according to the flow entries;
step S303: establishing an uplink group table GT of the switch 12 according to the flow entries;
step S304: acquiring a data packet by the switch 12;
step S305: comparing the data packet with the downlink flow table DT;
step S306: comparing the data packet with the uplink flow table UT;
step S307: generating an optimal transmission path for allocating the data packet by using an equal cost multi-path routing mechanism according to the uplink flow table UT, the downlink flow table DT, and the uplink group table GT;
step S308: allocating the data packet of the switch 12 to the optimal transmission path by the controller 10.

In step S301 to step S303, the switch 12 generates the downlink flow table DT, the uplink flow table UT, and the uplink group table GT. The generation methods of the downlink flow table DT, the uplink flow table UT, and the uplink group table GT are previously illustrated. Thus, they are omitted here. In step S304, when the data packet is received by the switch 12, header information of the data packet is compared with entries of the downlink flow table DT in step S305 by the controller 10. Then, the header information of the data packet is compared with entries of the uplink flow table UT in step S306 by the controller 10. Specifically, the order of step S305 and step S306 cannot be exchanged. Then, the controller 10 can use the equal cost multi-path routing mechanism (ECMP) for generating the optimal transmission path for allocating the data packet according to the uplink flow table UT, the downlink flow table DT, and the uplink group table GT. In step S308, the data packet of the switch 12 can be allocated to the optimal transmission path by the controller 10. Finally, the data packet can be transmitted through the optimal transmission path.

Figure 4:
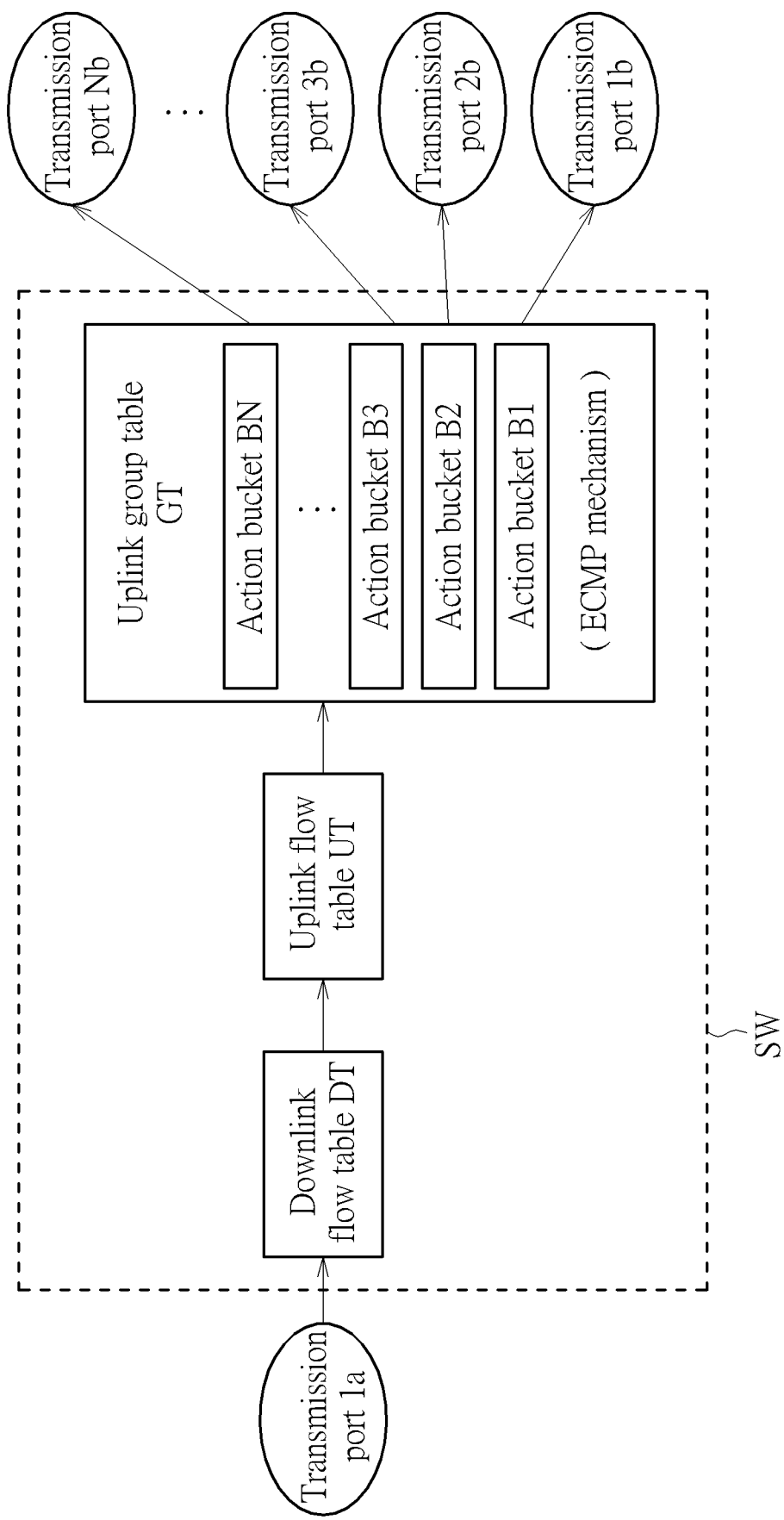
FIG. 4 is an illustration of transmission paths allocation of a switch in the data center under the soft defined network in FIG. 1.

FIG. 4 is an illustration of transmission paths allocation of a switch SW in the data center 100 under the soft defined network. As previously mentioned, the TCAM of the switch SW can be used for saving the uplink flow table UT, the downlink flow table DT, and the uplink group table GT. Briefly, a data packet is received by the transmission port 1a of the switch SW. Then, the switch SW can generate all possible transmission paths of the data packet according to the uplink flow table UT and the downlink flow table DT. Further, the switch SW can generate an optimal transmission path by using the ECMP mechanism according to the uplink group table GT. Particularly, the ECMP mechanism belongs to an equally likely random allocation process, which randomly selects one transmission port from transmission ports 1b to 1N listed in the uplink group table GT. N is a positive integer. In other words, the ECMP mechanism can perform a uniform selection mode defined by the OpenFlow version 1.3. The ECMP mechanism can trigger action buckets for enabling the transmission ports listed in the uplink group table GT. Here, each action bucket corresponds to a transmission port. For example, an action bucket B1 corresponds to a transmission port 1b. An action bucket B2 corresponds to a transmission port 2b. An action bucket BN corresponds to a transmission port Nb. By using the uniform selection mode, the switch SW can achieve satisfactory transmission performance with traffic load balance. Additionally, when a transmission port currently used is unexpectedly unavailable, the ECMP mechanism can replace a failure transmission port with an available transmission port listed in the uplink group table GT. In other words, a failover function can be achieved by switching to the available or standby transmission port. Eventually, the data packet can be transmitted through the optimal transmission path.

Although the downlink flow table DT, the uplink flow table UT, and the uplink group table GT are used by the switch 12 (i.e., the aggregate level switches 12) for generating the optimal transmission path, the core level switch 11 and the edge level switch 13 can also use corresponding flow tables for optimizing data transmission. For example, a downlink flow table DT can be generated by the core level switch 11. An uplink flow table UT and an uplink group table GT of the core level switch 11 can include null data because the core level switch 11 is allocated on an upper level of the data center 100. In other embodiments, the uplink flow table UT and the uplink group table GT of the core level switch 11 can be omitted. Similarly, a downlink flow table DT, an uplink flow table UT and an uplink group table GT can be used by the edge level switch 13. For example, the downlink flow table DT of the edge level switch 13 includes addresses of hosts. In FIG. 1, each edge level switch 13 corresponds to two hosts. Thus, for the edge level switch 13, two entries are introduced (or listed) to the downlink flow table DT. However, the method for managing traffic item of the present invention can be applied to a time-varied or a dynamic network. In the time-varied or the dynamic network, positions of the switches or hosts may be changed over time. Also, some hosts may be added to or deleted from the network. Table 1 illustrated changes of the downlink flow table DT, the uplink flow table UT and the uplink group table GT of switch when the position of the switch or the host is changed, added, or deleted.

TABLE 1

| network variation | downlink flow table DT aggregate level switch 12 and edge level switch 13 | downlink flow table DT core level switch 11 | uplink flow table UT aggregate level switch 12 and edge level switch 13 | uplink group table GT aggregate level switch 12 and edge level switch 13 |
| --- | --- | --- | --- | --- |
| switch position of the topology network is changed | amended | original | amended | amended |
| host 14 is changed | amended | amended | original | original |
| (added or deleted) position of host 14 is changed | amended | original | original | original |

In Table 1, for the data center 100, when the host position is changed, the downlink flow tables DT of the aggregate level switch 12 and the edge level switch 13 are amended. When the host 14 is added or deleted, the downlink flow tables DT of the core level switch 11, the aggregate level switch 12, and the edge level switch 13 are amended. When the switch position is changed, the flow tables are amended exclusive of the downlink flow tables DT of the core level switch 11. In conclusion, when all switches are fixed in the data center 100, even if some hosts are changed, no major amendment is introduced for updating original flow tables. Thus, the method for managing traffic item of the present invention can be applied to the time-varied network without introducing high complexity.

Figure 5:
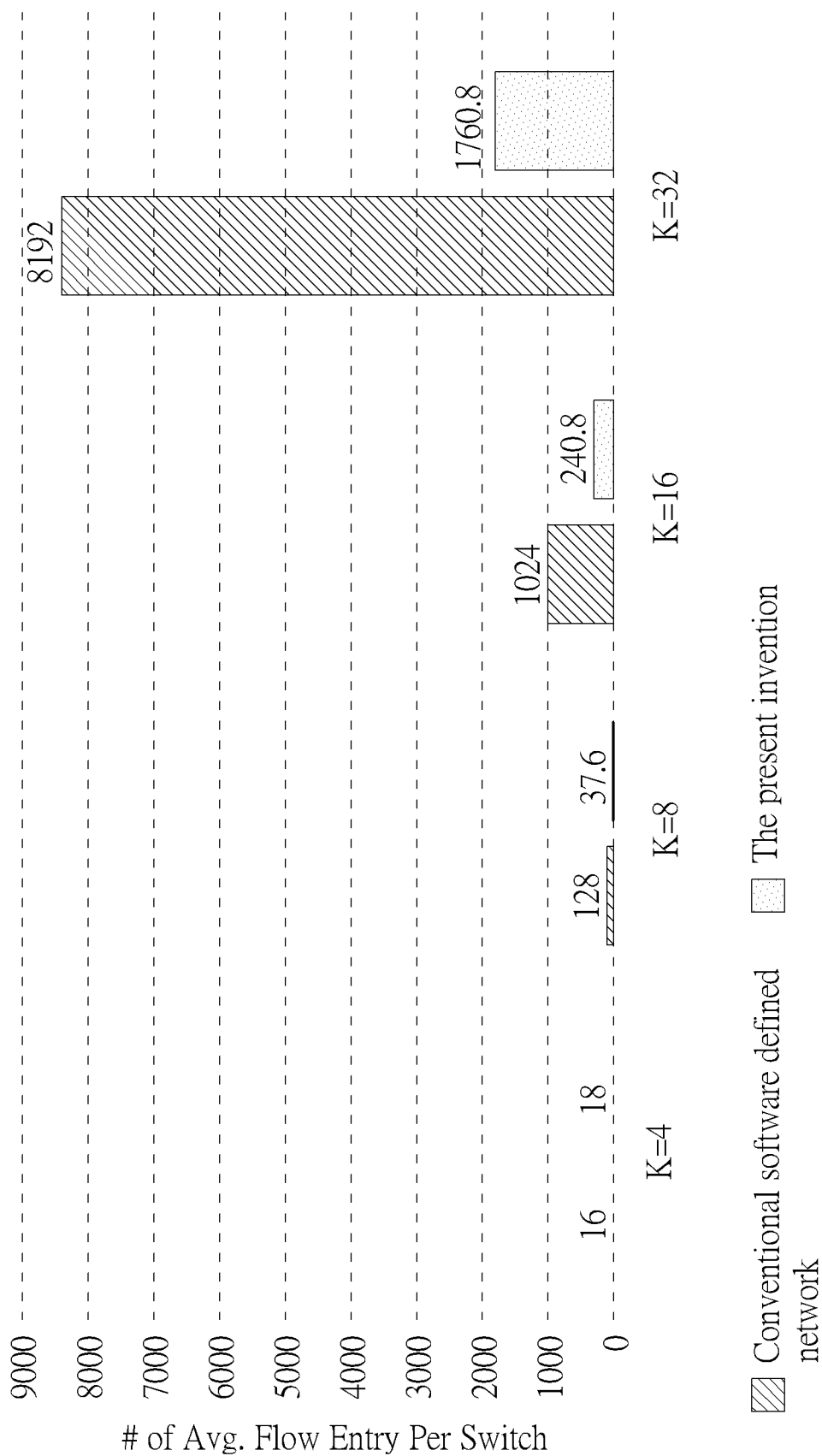
FIG. 5 is an illustration of an increasing trend of the flow entries when dimension of the topology structure of the data center under the soft defined network in FIG. 1 is increased.

FIG. 5 is an illustration of an increasing trend of the flow entries when a dimension of the topology structure of the data center 100 under the soft defined network is increased. In FIG. 5, slash area is denoted as the number of average flow entries of each switch when the dimension of the topology structure of a conventional data center is increased. Dotted area is denoted as the number of average flow entries of each switch when the dimension of the topology structure of the data center 100 is increased. As shown in FIG. 5, when the dimension (i.e., denoted as K) of the topology structure is increased doubly, the number of average flow entries under the conventional data center is exponentially increased. However, the number of average flow entries under the data center 100 is slightly increased. Here, the dimension K is a positive value associating with the number of hosts. In the embodiment, the number of hosts can be approximated to ($K^3/4$). For example, in FIG. 1, the number of hosts 14 in the Fat-tree topology structure is equal to 16. It can be derived that the dimension K of the data center 100 in FIG. 1 is equal to four (i.e., $4^3/4=16$). In FIG. 5, when the dimension K of the topology structure becomes very large (i.e., for example, K=32), a gap between the number of average flow entries under the data center 100 (i.e., 1760.8) and the number of average flow entries under the conventional data center (i.e., 8192) is significantly large. In the conventional data center, each switch may establish at least one flow table by listing all possible transmission paths. For example, when the conventional data center is applied to the Fat-tree topology structure in FIG. 1 (K=4), each core level switch requires a flow table with (4×2×2=16) flow entries. Thus, large TCAM capacity of the conventional switch is required for saving data of flow entries. Specifically, the required TCAM capacity of the conventional switch is exponentially increased as the dimension K increases. In other words, the data center 100 of the present invention can manage flow entries without sacrificing too much TCAM capacity when the dimension K is increased. Thus, the data center 100 is suitable for applying to a topology network with high dimension.

Figure 6:
FIG. 6 is an illustration of an increasing trend of the flow entries when network traffic of the data center under the soft defined network in FIG. 1 is increased.

FIG. 6 is an illustration of an increasing trend of the flow entries when the network traffic of the data center 100 is increased. In FIG. 6, slash area is denoted as a trend of the flow entries when the network traffic of the conventional data center is increased. Dotted area is denoted as the trend of the flow entries when the network traffic of the data center 100 is increased. Particularly, the dimension K is equal to four in FIG. 6. As shown in FIG. 6, when the network traffic of the conventional data center is increased, the increasing trend of the flow entries can be regarded as a monotonic increasing function so that the number of total flow entries is also increased. However, when the network traffic of the data center 100 of the present invention is increased, the increasing trend of the flow entries can be regarded as a fixed non-increasing function so that the number of total flow entries is also fixed. Since the method for managing traffic item of the present invention belongs to a topology-based flow entries management method, complexity of the data center 100 is only relevant to the dimension K. In other words, the complexity of the data center 100 is irrelevant to the network traffic or the number of total flow entries. For example, in the data center 100 with dimension K equal to four (K=4), each core level switch 11 has 16 downlink entries. Each aggregate level switch 12 has two uplink entries and a transmission port group entry. Each edge level switch 13 has two uplink entries and a transmission port group entry. Further, each aggregate level switch 12 has four downlink entries. Each edge level switch 13 has two downlink entries. Therefore, when the dimension K of the data center 100 is equal to four (K=4), the number of total flow entries of the data center 100 is equal to 16×4+(2+1)×(8+8)+(4×8)+(2×8)=160.

To sum up, the present invention illustrates a method for managing traffic item of a data center under a software defined networking. The method uses a downlink flow table, an uplink flow table, and an uplink group table of a switch without any information loss instead of using a conventional complex flow table listed all possible flow entries for greedy search. Further, the number of average flow entries of the switch is slightly increased when the dimension of the data center is increased. The number of total flow entries of the data center is fixed when the network traffic of the data center is increased. Thus, the data center of the present invention can provide a method for managing traffic item with low complexity in conjunction with low memory capacity requirement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing traffic item in a software defined networking comprising:
    establishing a downlink flow table of a switch according to the flow entries;
    establishing an uplink flow table of the switch according to the flow entries;
    acquiring a data packet by the switch; and
    generating a transmission path for allocating the data packet according to the data packet, the downlink flow table, and the uplink flow table;
    wherein the downlink flow table comprises a correlation of a plurality of first transmission ports of the switch and at least one downlink switch, the uplink flow table comprises a correlation of the plurality of first transmission ports of the switch and a transmission port group of at least one uplink switch; and
    wherein the uplink flow table further comprises an uplink group table, and the uplink group table comprises topology structure data associating with connections between the transmission port group and a plurality of second transmission ports of the switch.

2. The method of claim 1, further comprising:
    using an equal cost multipath routing mechanism for optimizing the transmission path of the data packet.

3. The method of claim 1, wherein the switch is an aggregate level switch, the at least one downlink switch is at least one core level switch, and the at least one uplink switch is at least one edge level switch.

4. The method of claim 1, wherein the software defined networking corresponds to a topology structure of an OpenFlow protocol, and the topology structure is a Fat-Tree topology structure.

5. A software defined networking system comprising:
    a plurality of aggregate level switches, each aggregate level switch comprising a downlink flow table and an uplink flow table;
    a plurality of core level switches linked to the plurality of aggregate level switches;
    a plurality of edge level switches linked to the aggregate level switches; and
    a controller linked to the plurality of core level switches, the plurality of aggregate level switches, and the plurality of edge level switches;
    wherein after a data packet is acquired by an aggregate level switch, the controller generates a transmission path for allocating the data packet according to the data packet, the downlink flow table, and the uplink flow table, the downlink flow table comprises a correlation of a plurality of first transmission ports of the aggregate level switch and at least one edge level switch corresponding to the aggregate level switch, the uplink flow table comprises a correlation of the plurality of first transmission ports of the aggregate level switch and a transmission port group of at least one core level switch corresponding to the aggregate level switch.

6. The system of claim 5, wherein each core level switch comprises an uplink flow table, and each edge level switch comprises a downlink flow table and an uplink flow table.

7. The system of claim 5, wherein the uplink flow table further comprises an uplink group table, and the uplink group table comprises topology structure data associating with connections between the transmission port group and a plurality of second transmission ports of the aggregate level switch.

8. The system of claim 7, wherein the topology structure data is Fat-Tree topology structure data.

9. The system of claim 5, wherein the controller uses an equal cost multipath routing mechanism for optimizing the transmission path of the data packet.

10. A method for managing traffic item in a software defined networking comprising:
    establishing a downlink flow table of a switch according to the flow entries;
    establishing an uplink flow table of the switch according to the flow entries;
    acquiring a data packet by the switch; and generating a transmission path for allocating the data packet according to the data packet, the downlink flow table, and the uplink flow table;

wherein the downlink flow table comprises a correlation of a plurality of first transmission ports of the switch and at least one downlink switch, the uplink flow table comprises a correlation of the plurality of first transmission ports of the switch and a transmission port group of at least one uplink switch; and wherein the switch is an aggregate level switch, the at least one downlink switch is at least one core level switch, and the at least one uplink switch is at least one edge level switch.

11. The method of claim 10, further comprising:

using an equal cost multipath routing mechanism for optimizing the transmission path of the data packet.

12. The method of claim 10, wherein the software defined networking corresponds to a topology structure of an OpenFlow protocol, and the topology structure is a Fat-Tree topology structure.

* * * * *